United States Patent [19]

Nakano

[11] Patent Number: 4,798,237
[45] Date of Patent: * Jan. 17, 1989

[54] MOLDING DIE FOR USE IN CASTING

[76] Inventor: Akio Nakano, 14-1, Ichikawaminami 3-chome, Ichikawa-shi, Chiba-ken, Japan

[*] Notice: The portion of the term of this patent subsequent to Mar. 1, 2005 has been disclaimed.

[21] Appl. No.: 934,657

[22] Filed: Nov. 25, 1986

[30] Foreign Application Priority Data

Nov. 30, 1985 [JP] Japan .................................. 60-270480
Nov. 30, 1985 [JP] Japan .................................. 60-270482

[51] Int. Cl.$^4$ ............................................. B22D 27/15
[52] U.S. Cl. .................................... 164/255; 164/305; 164/312; 164/338.1; 164/348; 164/529
[58] Field of Search .................... 164/61, 65, 120, 253, 164/254, 255, 305, 319, 320, 321, 339, 340, 342, 410, 338.1, 348, 529

[56] References Cited

U.S. PATENT DOCUMENTS 4,079,911 3/1978 Wirtz et al. .................. 164/338.1

FOREIGN PATENT DOCUMENTS 52-63819 5/1977 Japan .................................. 164/319
60-83762 5/1985 Japan .................................. 164/305
60-102250 6/1985 Japan .................................. 164/340

Primary Examiner—Nicholas P. Godici
Assistant Examiner—Richard K. Seidel
Attorney, Agent, or Firm—Klauber & Jackson

[57] ABSTRACT

This invention concerns an improvement in a molding die for use in casting in which a metal article is molded by charging a molten metal to the inside of a molding die comprising paired male and female dies, and then cooling the temperature of the molten metal to a solidification region and a solidification range where the solid phase and the liquid phase are present together, wherein one or both of paired male and female dies constituting the molding die equipped retractably with a pressurizing insert for applying the pressure to the molten metal charged to the molding die is made of ceramics thereby obtaining a molding die that can facilitate the control for the temperature distribution over the entire molding die, particularly, within the molding die upon cooling to solidify the molten metal, as well as having sufficient strength such as thermal shock resistance, shock resistance and durability enabling to mold a high temperature metal article by solidifying the high temperature molten metal of about 600° to 1650° C. while applying a pressure.

4 Claims, 2 Drawing Sheets

MOLDING DIE FOR USE IN CASTING

BACKGROUND OF THE INVENTION

1. Field of the Invention

This invention concerns a molding die for use in casting which is utilized for casting processes such as die casting, pressure casting and vacuum casting and, more particularly, it relates to a molding die for casting metal articles by using high temperature molten metal at a temperature about from 600 to 1650° C. and solidifying them under pressure.

2. Description of the Prior Art

In the casting process of this type, metal articles are cast by charging molten metal to the inside of a molding die comprising paired male and female dies, and cooling the molten metal under pressure to a temperature in a solidification region and solidification range where the solid phase and liquid phase are present together while applying a pressure to the molten metal. Since the control for the distribution of the temperature over the entire molding die within the solidification region and the solidification range, specifically, the control for the cooling rate within the molding die has a significant effect on the composition of the blended alloy composed of each of ultra-fine elements in the texture of the articles, control for the temperature distribution over the entire molding die upon coagulation of the molten metal is important.

However, since both of the male and female dies in the conventional molding die have been made of heat-resistant metal material, the cooling rate tends to be more rapid as a whole and the temperature of the die has to be raised in order to overcome the problem and the life of the die shortened, particularly if a pressure is applied thereto. It is thus difficult to control the temperature distribution for each of the portions in the molding die and fatal defects such as dents or sinks are caused at a thick-walled portion processing larger amount of heat where solidification is delayed as compared with other portions in that element are solidified without fusing to each other and intrude as deep seams to the inside of the articles and sometime form holes, as well as reduction in the durability of the molding die is also caused.

Further, if gases involved to the inside of the molding portion upon charging the molten metal in the casting process of this type are not rapidly degased upon charging, the back pressure in the molding portion is increased along with the charge of the molten metal to hinder the filling, thereby causing defective distribution of the molten metal to cause spiral defects in the articles, or the involved gases compressed upon charging of the molten metal and intruding near the surface thereof are expanded into swelled portions in the size of about rice grain upon mold-opening, which are left on the cast surface of the articles causing problems in view of the cast surface and appearance. Moreover, fine cast surface can not be obtained to cause surface defects failing to obtain fine cast surface with no cast creasings. Accordingly, rapid degasing of involved gases from inside of the molded portion has a significant effect for obtaining satisfactory cast surface with no surface defects from the surface of the articles.

Further, if gases evolved, paricularly, in the thick-walled portion with larger amount of heat upon solidification are not degased before the complete solidification the molten metal, gas sinks are liable to be caused in that portion causing the internal defect that impairs the strength. Accordingly, it is extremely important for rapidly and effectively eliminating gases before the complete solidification of the molten metal in order to obtain high quality and high strength articles with no defects in the inside thereof.

However, since degasing channels in the conventional molding dies are composed holes or grooves in communication with the atmospheric air, the gases involved into the molding part upon charging the molten metal are degased only while the charged molten metal flows through the degasing channels composed of the holes or the grooves and no effective degasing can be obtained. Further, no effective degasing can be attained also for the gases evolved upon solidification and, as a result, surface or internal effects are liable to be caused thereby bringing about severe problems in the art of this field.

Further, those insert component parts (movable hob, movable pin or the like) fitted to a male or female die of the molding die for applying pressure to the molten metal after charging are made of heat-resistant metal material, they can not withstand the thermal shocks undergoing from the high temperature molten metal at about 600-1650° C. and, as a result, the surface of the inserts for urging the molten metal is damaged into spherical shape or causes cracking due to the repeatedly applied thermal shocks to result in significant effects on the quality and the dimensional accuracy of the articles.

OBJECT AND SUMMARY OF THE INVENTION

The object of this invention is to facilitate the control for the temperature distribution within a molding die formed along with the cooling rate upon solidification of the molten metal.

Another object of this invention is to enable to the molding of metal articles at high density and high quality comprising ultra-fine structure by effectively and rapidly removing gases involved to the inside of the molding die and residual gases upon charging of the molten metal or gases evolved upon solidification of the molten metal thereby eliminating sinks or gas sinks.

A further object of this invention is to provide a molding die having sufficient strength such as thermal shock resistance, shock resistance or durability free from the risk of undergoing fusion damage due to high temperature molten metal at a temperature from 600° to 1650° C.

These objects can be attained by the molding die for use in casting in accordance with this invention.

The first invention of this application concerns a molding die for use in casting in which one or both of a component of a molding die comprising a pair of male or female die retractably equipped with pressurizing insert components is made of ceramics, heating and cooling mechanisms are disposed to both of the male and female dies and de-pressurizing and degasing mechanisms are assembled into an appropriate portion.

With the constitution as has been described above, after closing both of the paired male and female dies, molten metal is started to charge while applying moderate cooling and heating to the molding die by actuating the cooling and heating mechanisms and, substantially at the same time, gases involved in the inside of the molding portion are sucked to discharge out of the molded portion by actuating the depressurizing mechanism. Then, upon completion of the molten metal charging, pressure is applied to the molten metal charged and filled to the inside of the molding portion by advancing the pressurizing insert the degasing mechanism is actuated to forcibly drive the gases evolved in the thick-walled portion with larger amount of heat to the outside of the molding portion. In the molding step from the completion of charging the molten metal to the starting of the mold-opening, the inside of the molding portion is heated to an appropriate temperature by the heating mechanism at the initial stage of the step and, thereafter, the molten metal is cooled to solidify to a solidification region and a coagulation range of the molten metal by the cooling mechanism.

The second invention provides a molding die for use in casting, wherein one or both of the components of the molding die comprising a pair of male and female dies equipped with cores or inserts are made of ceramics, heating and cooling mechanisms are disposed to both of the dies, heat resistant porous gas permeable material is assembled into the insert to form a degasing channel and the core or the insert is made of ceramics or heat resistant porous gas permeable material.

With the molding die having the foregoing constitution, after the mold-closing for both of the paired male and female dies, the molten metal is started to charge while applying moderate cooling and heating to the molding die by actuating the cooling mechanism and heating mechanism and, at the same time, gases involved in the molding portion upon charging are sucked to eliminate by way of the degasing channels made of porous gas permeable member to the outside of molding portion. Then, simultaneously with the completion of the charging of the molten metal, pressure is applied to the molten metal charged and filled to the inside of the molding portion by actuating the core or the insert made of ceramics or heat-resistant porous gas permeable material.

In the molding step after the completion of the charging of the molten metal to the start of the mold-opening, the temperature inside the molding portion is increased by the heating mechanism at the initial stage of the step and, thereafter, the molten metal is cooled to solidify into the temperature in the solidification region and the solidification range of the molten metal.

BRIEF DESCRIPTION OF THE ACCOMPANYING DRAWINGS

These and other objects will become apparent by reading the following detailed descriptions for the embodiments of this invention referring to the accompanying drawings, wherein FIG. 1 is a front elevational view in a vertical cross section illustrating a molding die for use in casting according to the first invention; and FIG. 2 is a front elevational view in a vertical cross section illustrating a molding die for use in casting according to the second invention.

DETAILED DESCRIPTION OF THE PREFERRED EMBODIMENT

Figure 1:
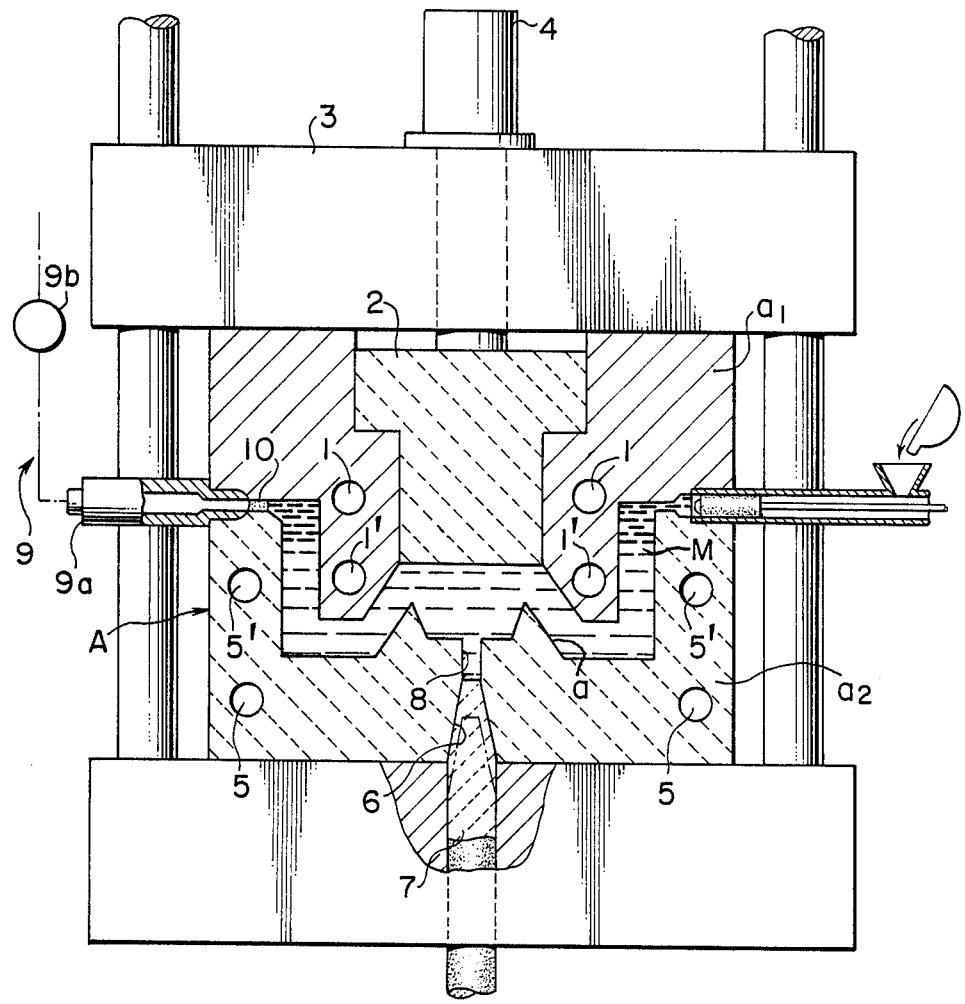

FIG. 1 illustrates a molding die A for use in casting according to the first invention. The molding die A comprises a pair of male die a1 and female die a2 and molten metal M as the material for the article is charged to fill to the inside of the molding die A.

While there are no particular restrictions for the material of the molten metal M, they are preferably super plastic metals, for example, Zn type alloys comprising Zn as the main ingredient and 0~68 wt% Al, 0~5 wt% Si, 0~10 wt% Cu, 0~5 wt% Mg, 0~5 wt% Mn, 0~3 wt% Fe, 0~3 wt% Ti, 0~5 wt% Ni, 0~3 wt% Cr, 0~3 wt% Pb, 0~10 wt% Sn, 0~10 wt% Be, 0~5 wt% P, 0~40 wt% C, 0~5 wt% W, 0~3 wt% B, Al type alloys comprising aluminum (Al) as the main material and 0~20 wt% Si, 0~20 wt% Cu, 0~10 wt% Mg, 0~20 wt% Zn, 0~12 wt% Mn, 0~5 wt% Fe, 0~3 wt% Ti, 0~5 wt% Ni, 0~5 wt% Cr, 0~3 wt% Pb, 0~3 wt% Sn, 0~10 wt% C, 0~5 wt% Be, 0~3 wt% W, 0~3 wt% Ag, 0~5 wt% B, 0~5 wt% Sr, 0~5 wt% Li, 0~5 wt% Zr, 0~5 wt% Na, 0~5 wt% Sb, 0~5 wt% Cd, 0~5 wt% Mo, Cu type alloys comprising copper (Cu) as the main material and 0~20 wt% Si, 0~20 wt% Al, 0~5 wt% Mg, 0~30 wt% Zn, 0~20 wt% Mn, 0~3 wt% Fe, 0~5 wt% Ti, 0~10 wt% Ni, 0~10 wt% Cr, 0~5 wt% Pb, 0~5 wt% Sn, 0~20 wt% C, 0~5 wt% Be, 0~10 wt% W, 0~5 wt% B, 0~5 wt% Sb, 0~5 wt% Li, 0~5 wt% P, 0~5 wt% Zr, 0~5 wt% Se and further Fe type alloys comprising iron (Fe) as the main material and 0~60 wt% C, 0~5 wt% Mn, 0~5 wt% Si, 0~10 wt% Cr, 0~20 wt% Ni, 0~5 wt% Mo, 0~3 wt% V, 0~5 wt% P, 0~2 wt% S, 0~3 wt% Pb, 0~10 wt% Sn, 0~10 wt% Be, 0~3 wt% Ag, 0~24 wt% Cu, 0~20 wt% W, 0~5 wt% B, 0~5 wt% Li, 0~5 wt% Zr.

The male die a1 is made of heat-resistant metal (including sintered metal) such as of high chromium-molybdenum steels and cooling mechanism 1 and heating mechanism 1' are disposed to the inside of the die.

While the arrangement for the cooling mechanism 1 and the heating mechanism 1' are illustrated in the case of promoting the heating, the arrangement for both of the mechanisms 1 and 1' may optionally be varied in the case of promoting the cooling.

Further, pressurizing insert 2 is slidably fitted to the central portion of the male die a1 so as to move retractably in the vertical direction, and the insert 2 is connected to a cylinder 4 disposed on a movable board 3.

The pressurizing insert 2 is made of ceramics.

The female die a2 is made of ceramics and cooling mechanism 5 and heating mechanism 5' are disposed therein. Further, degasing channel 6 communicating to the inside of molding portion a is penetrated at an appropriate position, that is, through the control portion of the die opposed to the thick-walled portion of the molten metal with larger amount of heat where the gases are liable to be evolved upon coagulation of the molten metal M in the drawing. Degasing mechanism 7 is assembled to the degasing channel.

The degasing mechanism 7 comprises a degasing plug formed substantially in a conical shape made of ceramics of heat-resistant porous gas permeable member, for example, porous ceramics which is tightly fitted toward a molten metal pool 8 formed near the inlet of the degasing channel 6 such that it can detachably and retractably move in the vertical direction. The degasing mechanism 7 is adapted to drive and discharge the gases evolved in the thick-walled portion to the inside of the degasing channel 6 including the molten metal pool 8 by retracting in a small extent and at a predetermined timing with the advancing operation (pressurization) of the pressurizing insert 2, that is, at a predetermined timing just after the formation of the coagulated membranes to the surface of the molten metal M of the thick-walled portion with greater heat. The degasing mechanism 7 is connected with a driving source (not illustrated) and retracted or advanced by the operation of the driving source.

Depressurizing mechanism 9 is incorporated at an appropriate portion on both of the male and female dies a1 and a2, that is, at the mold splitting faces between both of the molds a1 and a2 in the drawing.

The depressurizing mechanism 9 serves to suck and eliminate the gases involved in the molding portion upon charging the molten metal M to the outside of the molding portion a, as well as improve the distribution of the molten metal M, that is, improve the charging density of the molten metal M by evacuating the inside of the molding portion a. A suction pipe 9a is connected in communication with the molding portion a at the mold splitting face between both of the dies a1 and a2. The suction pipe 9a is connected at one end to vacuum device 9b and at the other end to heat-resistant porous gas permeable material, for example, porous ceramic material 10, so that it can automatically stop when the molten metal M is directly abutted against the porous ceramic material 10 but only the air or the gas can be evacuated, by which inaccurate operation of the estimated removing method in the prior art can be overcome. The vacuum device 9b is adapted to start the operation substantially at the same time with the starting for the charging of the molten metal M.

By forming the degasing mechanism (degasing plug) 7 with the porous ceramics as described above, it is possible to attain the effect of driving to discharge the gases evolved in the thick-walled portion with greater amount of heat upon coagulation and also a function as the degasing channel for eliminating the involved gases in the same manner as in the depressurizing mechanism 9, by which involved gases can be removed more effectively and rapidly from the inside of the molding portion a. In this case, a vacuum device is connected to the degasing mechanism (degasing plug) 7.

Then, explanation will be made to the structure of the ceramics for making the male mold a1, the pressurizing insert 2, the degasing mechanism (degasing plug) 7 and the composition.

The ceramics are hot-pressed α-sialon ceramics or α-sialon ceramics sintered at ambient pressure of a dense composite (solid-solubilized) structure wherein 60 vol% of granular α-sialon having an α-Si$_3$N$_4$ structured solid-solution and represented by Mx(Si, Al)$_{12}$(O, N)$_{16}$ (M represents Mg, Ca, Y in the above formula) and 40 vol% of columnar β-Si$_3$N$_4$ are present together intruded and solid solubilized by baking, which can be called as "partially stabilized" α-sialon region. In other words, 60 percent of granular α-sialon and 40 percent of columnar β-Si$_3$N$_4$ coexist to form partially stabilized α-sialon. The ceramics are excellent in the mechanical characteristics such as strength, hardness, toughness to break, as well as excellent in the thermal shock resistance and chemical weather proofness.

In such an embodiment, after closing both of the male and female dies a1 and a2, the molten metal M is charged to the molding portion a while controlling the temperature distribution of the mold in the molding portion a by applying appropriate cooling and heating to the molding portion a by actuating the cooling mechanisms 1 and 5 and heating mechanisms 1' and 5' repectively disposed to both of the dies a1 and a2. Substantially at the same time with the start of the charging, the vacuum device 9b is actuated to forcibly suck and eliminate involved gases in the molding portion a through the sucking pipe 9a as the sucking port.

Upon completion of the charging for the molten metal M, the pressurizing insert 2 is advanced by actuating the cylinder 4 to pressurize the molten metal M charged to fill in the molding portion a and, the degasing mechanism (degasing plug) 7 is briefly retracted by a small extent at a predetermined timing after the start of the pressurizing to drive and discharge the gases evolved in the thick-walled portion where the solidification is retarded as compared with other portions into the degasing channel 6 including the molten metal pool 8 with the pressure of the pressurizing insert 2 when solidification membranes are formed at the surface.

Then the process advances to the casting step as far as the mold opening. At the initial stage of the step, the inside of the molding portion a is appropriately warmed by actuating the heating mechanisms 1 and 5 and, thereafter, the cooling mechanisms 1' and 5' are actuated to cool the temperature of the molten metal M to the solidification region and the solidification range to mold an article. Then, the pressurizing insert 2 is retracted (upwardly) the operation of the vacuum device 9b of the depressurizing mechanism 9 is interrupted and the mold is opened to take out the article from the male die a1.

The position and the number of the degasing mechanism 7 and the depressurizing mechanism 9 are determined depending on the shape and the size of the article, as well as on the conditions such as temperature distribution or the solidification rate at each of the portions in the article. Further, the condition set for the heating mechanisms 1 and 5 and the cooling mechanisms 1' and 5' disposed to the molding die a may also be varied properly depending on the melting temperature and the ingredients in the molten metal, the shape of the molding die or the like.

The thus obtained article can optionally be further compressed and forged by a fine pressurizing step using a molding die of a higher dimensional accuracy and a male die a1 made of ceramics may also be used.

While the description has been made to the case of the pressurizing casting process in the foregoing embodiment, the molding die according to this invention can also be applied to those casting processes such as vacuum casting or die casting.

According to the first invention as has been described above, since one or both of the male and female dies of the molding dies is made of ceramics, increase in the rapid coloing rate within the molding die can be moderated due to the ceramic die as compared with the conventional metal die and, accordingly, the control range for the cooling rate by the cooling mechanisms can be broadened to particularly facilitate the control operation therefor, whereby the cooling rate can easily be set depending on the shape and the material of the article and, in addition, gases involved in the molding portion after the die-closure can rapidly be sucked and eliminated by the depressurizing mechanisms substantially at the same time with the start for the charging of the molten metal, as well as the gases evolved in the thick-walled portion with greater amount of heat upon solidification of the molten metal can rapidly be eliminated to the outside of the molding portion by the actuation (slight retraction) of the degasing mechanism substantially at the same time with the pressurization to the inside of the molding portion by the pressurizing insert. Accordingly, high density and high quality articles composed of ultra-fine structure with no sinks can be obtained.

Further, since the molding die is made of ceramics, a molding die having sufficient strength such as thermal shock resistance, shock resistance and durability can be obtained, which enables the casting by using high temperature metal of about 600° to 1650° C. and the die can be used for a long period of time.

Figure 2:
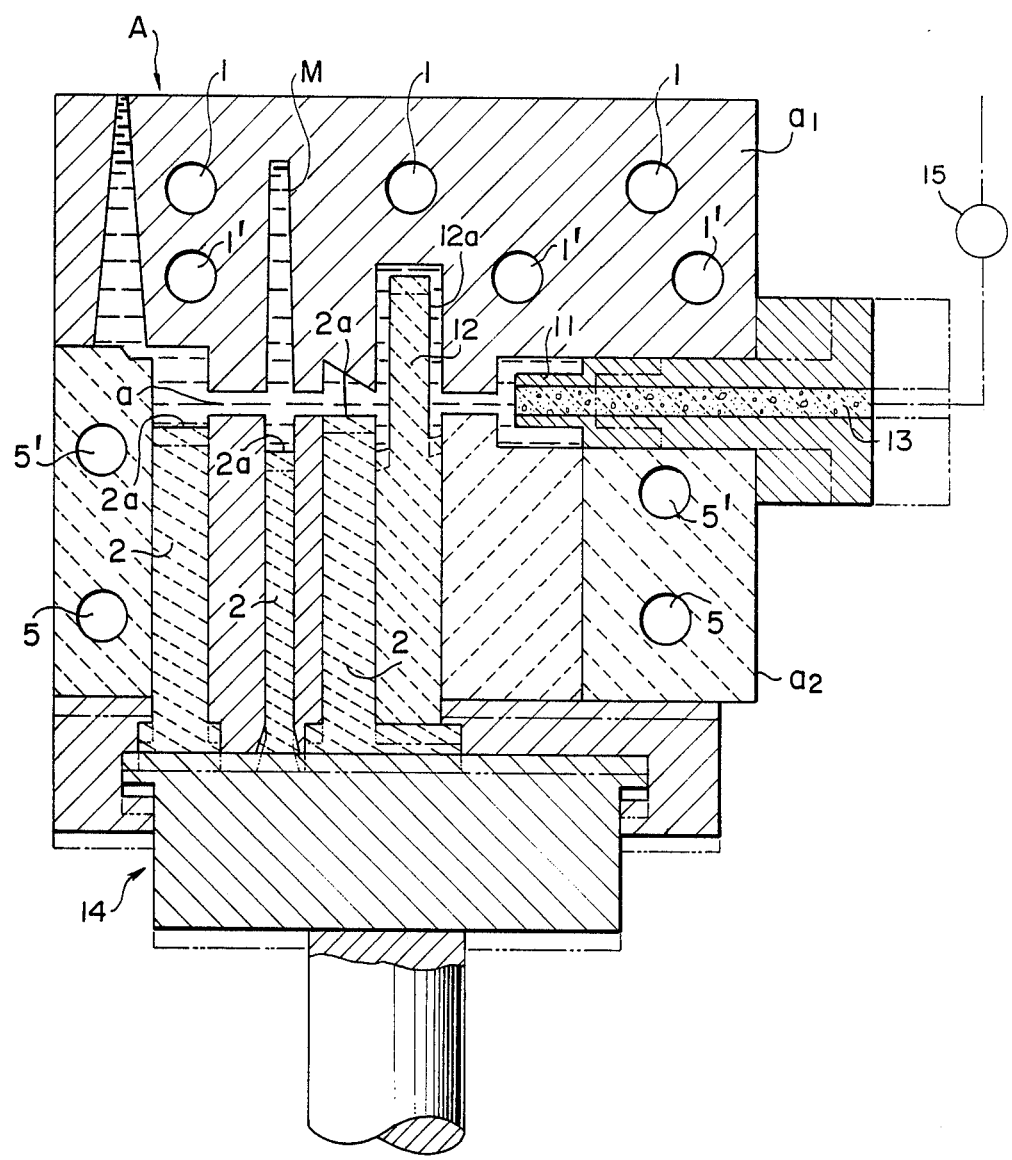

Explanation will then be made for the molding die A for use in casting according to the second invention while referring to FIG. 2. The molding die A comprises male die a1, female die a2, cores 11 and 12 and insert 2. After closing both of the male and female dies a1 and a2, molten metal M as the material for an article is charged to fill to the inside of the molding portion a which is then solidified under pressure to mold the article.

There are no particular restrictions on the material for the molten metal M and, it preferably comprises super plastic metals, for example, Zn type alloys comprising zinc (Zn) as the main material and $0 \sim 68$ wt% Al, $0 \sim 5$ wt% Si, $0 \sim 10$ wt% Cu, $0 \sim 5$ wt% Mg, $0 \sim 5$ wt% Mn, $0 \sim 3$ wt% Fe, $0 \sim 3$ wt% Ti, $0 \sim 5$ wt% Ni, $0 \sim 3$ wt% Cr, $0 \sim 3$ wt% Pb, $0 \sim 10$ wt% Sn, $0 \sim 10$ wt% Be, $0 \sim 5$ wt% P, $0 \sim 40$ wt% C, $0 \sim 5$ wt% W, $0 \sim 3$ wt% B, Al type alloys comprising aluminum (Al) as the main material and $0 \sim 20$ wt% Si, $0 \sim 20$ wt% Cu, $0 \sim 10$ wt% Mg, $0 \sim 20$ wt% Zn, $0 \sim 12$ wt% Mn, $0 \sim 5$ wt% Fe, $0 \sim 3$ wt% Ti, $0 \sim 5$ wt% Ni, $0 \sim 5$ wt% Cr, $0 \sim 3$ wt% Pb, $0 \sim 3$ wt% Sn, $0 \sim 10$ wt% C, $0 \sim 5$ wt% Be, $0 \sim 3$ wt% W, $0 \sim 3$ wt% Ag, $0 \sim 5$ wt% B, $0 \sim 5$ wt% Sr, $0 \sim 5$ wt% Li, $0 \sim 5$ wt% Zr, $0 \sim 5$ wt% Na, $0 \sim 5$ wt% Sb, $0 \sim 5$ wt% Cd, $0 \sim 5$ wt% Mo Cu type alloys comprising copper (Cu) as the main material and $0 \sim 20$ wt% Si, $0 \sim 20$ wt% Al, $0 \sim 5$ wt% Mg, $0 \sim 30$ wt% Zn, $0 \sim 20$ wt% Mn, $0 \sim 3$ wt% Fe, $0 \sim 5$ wt% Ti, $0 \sim 10$ wt% Ni, $0 \sim 10$ wt% Cr, $0 \sim 5$ wt% Pb, $0 \sim 5$ wt% Sn, $0 \sim 20$ wt% C, $0 \sim 5$ wt% Be, $0 \sim 10$ wt% W, $0 \sim 5$ wt% B, $0 \sim 5$ wt% Sb, $0 \sim 5$ wt% Li, $0 \sim 5$ wt% P, $0 \sim 5$ wt% Zr, $0 \sim 5$ wt% Se and further Fe type alloys comprising iron (Fe) as the main material and $0 \sim 60$ wt% C, $0 \sim 5$ wt% Mn, $0 \sim 5$ wt% Si, $0 \sim 10$ wt% Cr, $0 \sim 20$ wt% Ni, $0 \sim 5$ wt% Mo, $0 \sim 3$ wt% V, $0 \sim 5$ wt% P, $0 \sim 2$ wt% S, $0 \sim 3$ wt% Pb, $0 \sim 10$ wt% Sn, $0 \sim 10$ wt% Be, $0 \sim 3$ wt% Ag, $0 \sim 24$ wt% Cu, $0 \sim 20$ wt% W, $0 \sim 5$ wt% B, $0 \sim 5$ wt% Li, $0 \sim 5$ wt% Zr.

The male die a1 is made of heat-resistant metal (including sintered metal) such as of high chromium-molybdenum steels and cooling mechanism 1 and heating mechanism 1' are disposed to the inside of the die.

The male die a2 is made of ceramics, heating mechanism 5' and cooling mechanism 5 are disposed to the die and the core 11 sliding sideway from one side is disposed and adapted such that the core 11 is retractably displaced into the molding portion a so that it can be advanced into the molding portion a.

The core 11 is made of heat-resistant metal or ceramic material, in which heat-resistant porous gas permeable material, for example, porous ceramic material is penetrated and fitted along the axial line thereof extending over both of the end faces to constitute degasing channel 13 composed of the porous ceramics member to the core 11. A vacuum device 15 is connected to the outer end of the degasing channel 13 and the vacuum device is actuated at the start or after the actuation of the mold closing to forcibly suck and eliminate residual air in the molding portion a, gases involved upon charging of the molten metal M and gases evolved in the molding portion a.

The core 12 and the inserts 2 secured to be supported on support plate 14 at the lower surface of the female mold a2 are penetrated so as to be retractable in the vertical direction.

When the molten metal M is charged to fill to the inside of the molding portion a, the core 12 and the insert 2 are advanced upwardly by the support plate 7 and apply a pressure by the urging faces 2a and 12a to the molten metal M and they are made of ceramics or heat-resistant porous gas permeable material.

By forming the core 12 and the insert 2 with the same heat resistant porous gas permeable material as that for the degasing channel 13, for example, porous ceramics, the effect of pressurizing and degasing can be provided and the residual airs, involved airs or evolved gases can be excluded more effectively and rapidly from the molding portion a. In this case, a communication aperture is perforated to the support plate 14 which is connected with a vacuum device in the same manner as for the degasing channel 13.

The composition of the ceramics for preparing the female mold a2, the insert 2 and cores 11 and 12 as described above will now be explained.

The ceramics are hot-pressed α-sialon ceramics or α-sialon ceramics sintered at ambient pressure of a dense composite (solid-solubilized) structure wherein 60 vol% of granular α-sialon having an α-Si$_3$N$_4$ structured solid-solution and represented by Mx(Si, Al)$_{12}$(O, N)$_{16}$ (M represents Mg, Ca, Y in the above formula) and 40 vol% columnar β-Si$_3$N$_4$ are present together intruded and solid solubilized by baking, which can be called as "partially stabilized" α-sialon region. In other words, 60 percent of granular α-sialon and 40 percent of columnar β-Si$_3$Ni$_4$ coexist to form partially stabilized α-sialon. The ceramics are excellent in the mechanical characteristics such as strength, hardness and toughness at break, as well as thermal shock resistance, chemical and weather proofness.

In such an embodiment, after starting of the mold closure or after mold closure, the molten metal M is charged to the inside of the molding portion a while forcibly sucking gases through the degasing channel 13 made of porous ceramics by actuating the vacuum device while controlling the temperature distribution in the mold by applying moderate cooling and heating to the molding portion a by the heating mechanisms 1' and 5' and the cooling mechanism 1 and 5 of both of the male and female dies a1 and a2. Then, at substantially the same time with the completion of the charging and fill of the molten metal M, the temperature for both of the male and female dies a1 and a2 is lowered to the solidification region and the solidification range of the molten metal M while applying the pressure to the molten metal M by upwardly advancing the core 12 and the insert 2 made of ceramics or porous gas permeable material. The forced sucking from the degasing channel 13 by the vacuum device is always carried out after the starting of the closure or after the die closure till the article is obtained by lowering the temperature of the molten metal M to the solidification region and the solidification range thereby eliminating the residual air, the involved air and the gases in the thick-walled portion with greater amount of heat.

Further, the temperature distribution of the die is controlled by the heating mechanisms 1' and 5' and the cooling mechanisms 1 and 5 also in the solidification region and solidification range for the molten metal M so that gases evolved in the thick-walled portion with greater amount of heat is not remained.

Although, the explanation has been made in the foregoing embodiment that the male die a1 of the molding die A is made of heat-resistant metal such as high chromium-molybdenum steel, it may be made of ceramics in the same manner as in the female die a2. Further, combination of ceramics and low expansion metal or heat-resistant metal such as nobinite steels can also be used optionally.

According to the second invention as has been described above, since one or both of the male and female dies of the molding die is made of ceramics, control for the temperature distribution within the molding die can be facilitated by the ceramics die. Accordingly, since the entire molten metal charged and filled to the inside of the molding die can uniformly be cooled to the solidification region and the solidification range, high density and high quality article with super fine structure without dents or sinks due to the delay in the solidification can be molded.

Further, since the degasing channel is formed with heat-resistant porous gas permeable material, if the charged molten metal abuts against the degasing channel, no solidification membranes are formed thereon and the molten metal can surely be maintained till the temperature thereof is lowered to the solidification region and the solidification range, whereby the residual air, involved gases and evolved gases can be effectively and rapidly discharged.

Furthermore, since the core or the insert for applying the pressure to the molten metal charged and filled to the inside of the molding die are made of ceramics or heat-resistant porous gas permeable material, they are not damaged by fusion due to repeatedly applied thermal shocks even from high temperature melting metal of about 600° to 1650° C. In addition, since the molding die is made of ceramics, it has a rigidity of great endurance and can be used for a long period of time.

What is claimed is:

1. A molding die for use in casting, comprising:
a male die;
a female die associated with the male die so as to define an inner molding chamber therebetween;
at least one of said male and female dies being made of a ceramics material;
a pressuring insert associated with one of said male and female dies for applying pressure to a molten material in said molding chamber, said pressurizing insert formed of a ceramics material;
a heating mechanism disposed in both of said male and female dies;
a cooling mechanism disposed in both of said male and female dies;
a degasing plug movably assembled with the other of said male and female dies in opposing relation to said pressurizing insert and in fluid communication with said molding chamber, said degasing plug formed of a porous ceramics material; and
a depressurizing mechanism connected between said male and female dies and in fluid communication with said molding chamber to reduce gas pressure in said molding chamber.

2. A molding die for use in casting as defined in claim 1, wherein the depressurizing mechanism comprises a suction pipe in communication with the molding chamber of the molding die and also connected to a vacuum device and a heat-resistant porous gas permeable material is disposed to a top end of said suction pipe.

3. A molding die for use in casting, comprising:
a male die;
a female die associated with the male die so as to define an inner molding chamber therebetween;
at least one of said male and female dies being made of a ceramics material;
a pressuring insert associated with one of said male and female dies for applying pressure to a molten material in said molding chamber, said pressurizing insert formed of a ceramics material;
a heating mechanism disposed in both of said male and female dies;
a coolin mechanism disposed in both of said male and female dies;
a degasing plug movably assembled with the other of said male and female dies in opposing relation to said pressurizing insert and in fluid communication with said molding chamber, said degasing plug formed of a porous ceramics material;
a depressurizing mechanism connected between said male and female dies and in fluid communication with said molding chamber to reduce gas pressure in said molding chamber; and
said ceramics materials being a hot-pressed $\alpha$-sialon ceramics material sintered at ambient temperature and having a dense composite structure wherein 60 vol.% of granular $\alpha$-sialon having an $\alpha$-Si$_3$N$_4$ structured solid solution represented by $M_x(Si,Al)_{1-2}(O,N)_{16}$, M selected from the group consisting of Mg, Ca, Y, and 40 vol.% of columnar $\beta$-Si$_3$Ni$_4$ coexist to form partially stabilized $\alpha$-sialon.

4. A molding die for use in casting, comprising:
a male die;
a female die associated with the male die so as to define an inner molding chamber therebetween;
at least one of said male and female dies being made of a ceramics material;
a pressurizing insert associated with one of said male and female dies for applying pressure to a molten material in said molding chamber, said pressurizing insert formed of a ceramics material; p1 a core associated with at least one of said male and female dies and in fluid communications with said molding chamber, said core formed of a ceramics material; p1 an isert of a ceramics material assembled in said core to form a degasing channel in fluid communication with said molding chamber;
a depressurizing mechanism connected with the degasing channel;
a heating mechanism disposed in both of said male and female dies;
a cooling mechanism disposed in both of said male and female dies; and
said ceramics materials being a hot-pressed $\alpha$-sialon ceramics material sintered at ambient temperature and having a dense composite structure wherein 60 vol.% of granular $\alpha$-sialon having an $\alpha$-Si$_3$N$_4$ structured solid solution represented by $M_x(Si,Al)_{1-2}(O,N)_{16}$, M selected from the group consisting of Mg, Ca, Y, and 40 vol.% of columnar $\beta$-Si$_3$Ni$_4$ coexist to form partially stabilized $\alpha$-sialon.

* * * * *